Figure 1:
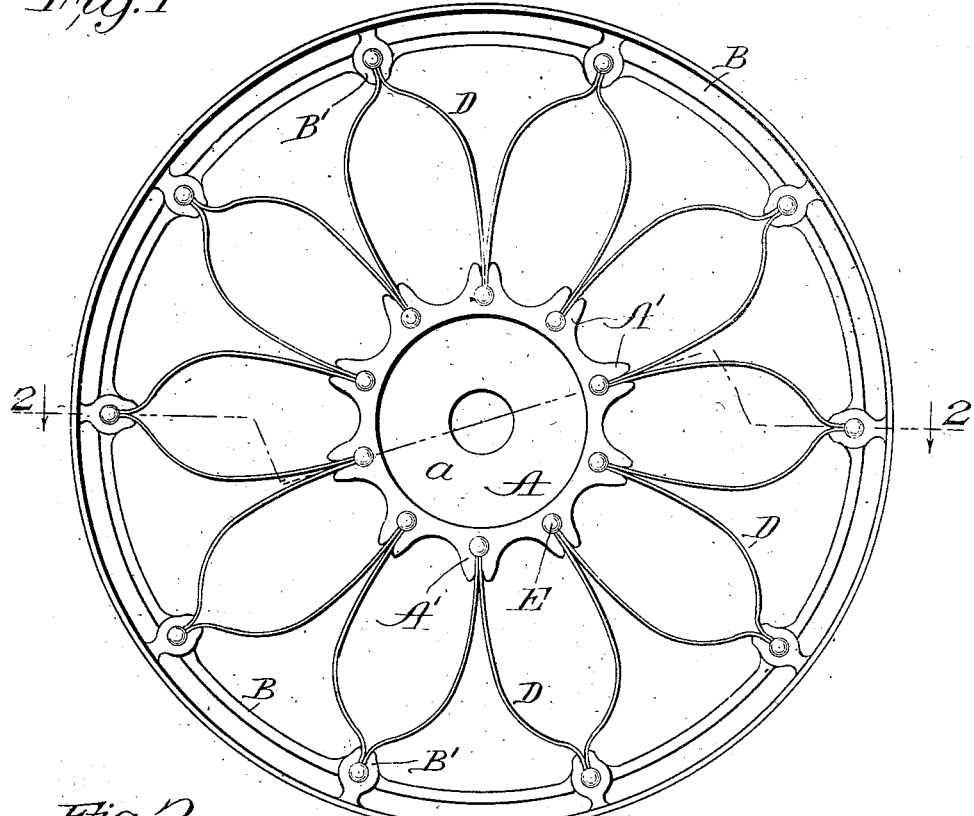

C. F. WOMELDORF.
VEHICLE WHEEL.
APPLICATION FILED MAY 19, 1913.

1,083,513.

Patented Jan. 6, 1914.

2 SHEETS—SHEET 1.

Witnesses:
P. J. Gathmann
M. E. Burrell

Inventor:
C. F. Womeldorf
By his Attorneys:
Baldwin Wight

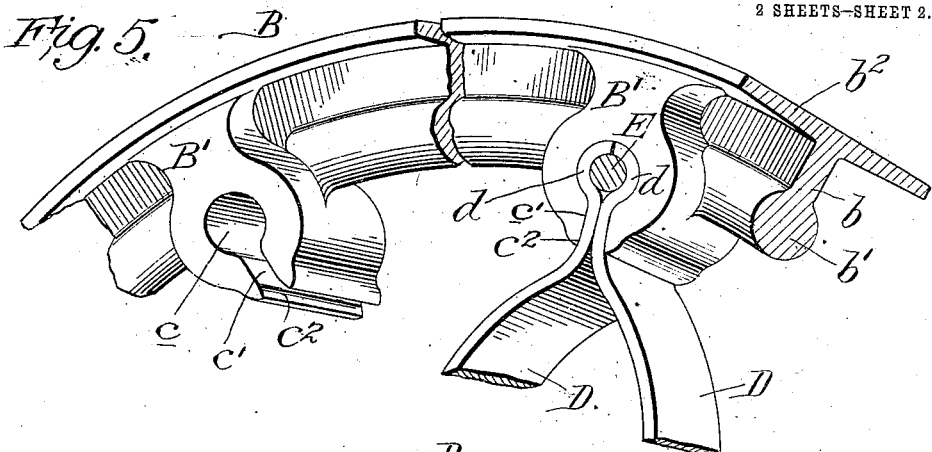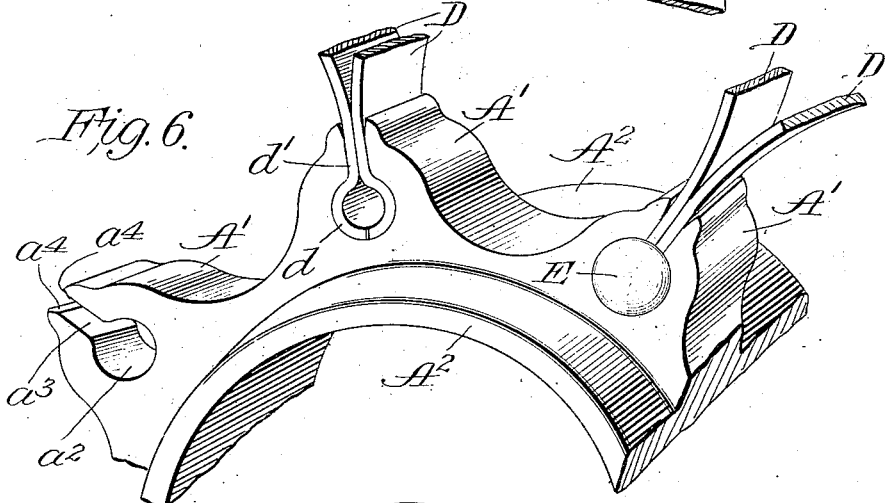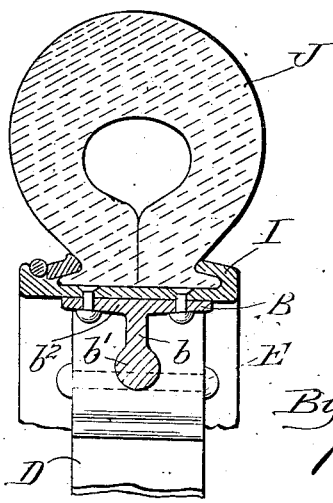

UNITED STATES PATENT OFFICE.

CHARLES F. WOMELDORF, OF WASHINGTON, DISTRICT OF COLUMBIA, ASSIGNOR OF ONE-HALF TO WILLIAM H. RICKARD, OF HARRISONBURG, VIRGINIA.

VEHICLE-WHEEL.

1,083,513.      Specification of Letters Patent.      Patented Jan. 6, 1914.

Application filed May 19, 1913. Serial No. 768,582.

*To all whom it may concern:*

Be it known that I, CHARLES F. WOMELDORF, a citizen of the United States, residing in Washington city, District of Columbia, have invented certain new and useful Improvements in Vehicle-Wheels, of which the following is a specification.

This invention relates to vehicle wheels of the kind known as spring wheels intended especially for use on automobiles and more particularly to wheels of this class embodying in their construction curved spring spokes.

The object of the invention is to construct a wheel of this kind in which the spokes are of such shape, are so related to each other, and are so connected to the hub and rim that the greatest possible strength is obtained with the required resiliency, and in which all strains and jars are resisted in such a way as to preserve the symmetrical arrangement of the spokes and avoid breakage by abrupt bending thereof at any point.

A further object of the invention is to provide a wheel embodying the characteristics above recited which is simple in construction, employing but few parts most of which are duplicates of each other and which can be easily and quickly assembled and rigidly connected or taken apart.

In carrying out my invention in the preferred way, I employ a hub made of a single piece of metal having spoke sockets of novel form to receive the inner ends of the spokes and a rim which is also preferably made of a single piece of metal and which is formed with sockets to receive the outer ends of the spokes, which latter are all of the same shape, being wide and relatively thin and of spring metal, and they are arranged in pairs in such manner as to provide a trussed structure between the hub and the rim. This trussed structure is obtained by causing each pair of spokes to join at the hub where they are firmly secured and are spread apart and diverge outwardly toward the rim to which they are attached on radial lines equi-distant from a radial line passing through the joint of the inner ends of the spokes with the hub. The outer end of each spoke of a pair is joined to the outer end of one of the spokes of the next adjacent pair, a single bolt or rivet being employed to hold them in position. In this way I am able not only to employ the most desirable number of spokes but to also so brace the wheel under all conditions as to resist all strains and jars while still providing the required resiliency.

My improvements are illustrated in the accompanying drawings, in which—

Figure 2:
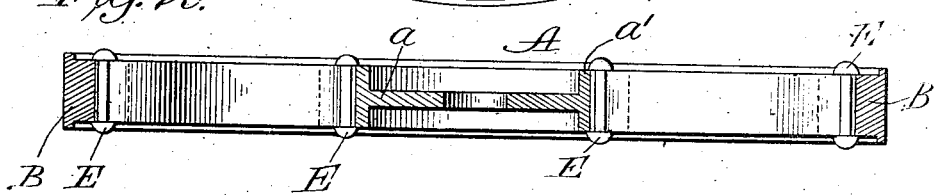
Figure 3:
Figure 4:
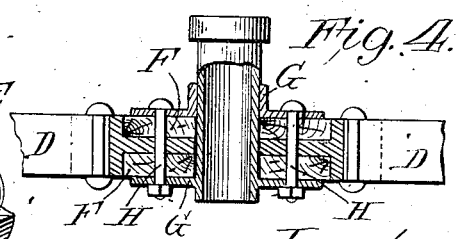

Figure 1 shows a side elevation of the wheel. Fig. 2 shows a section thereof on the line 2—2 of Fig. 1. Fig. 3 is a detail view showing the manner of securing the spokes to the hub. Fig. 4 is a detail view in section, showing how the wheel shown in Fig. 1 may be substituted for an automobile wheel of ordinary construction. Fig. 5 is a detail view, in perspective, and on an enlarged scale, showing how the spokes are secured at their outer ends to the rim. Fig. 6 is a similar view, showing how the spokes are attached to the hub. Fig. 7 is a detail view, in section, showing how the wheel may be provided with a soft tread.

The hub A may be made of metal by a single casting. It is formed with a web $a$ and a peripheral flange $a'$, having radially projecting lugs A′, formed with spoke sockets each of which has an inner cylindrical portion $a^2$ and an outer radial portion $a^3$ the walls of which are straight, and parallel except at their outer ends $a^4$ where they are beveled or flared for a purpose hereinafter described. The hub may, as shown in Fig. 6, be formed with laterally projecting flanges A² to enlarge it. The rim B may be made in one piece and preferably it is formed with a web $b$ having a bead $b'$ on its inner edge and a wide flange $b^2$ on its outer edge. At suitable intervals it is formed with bosses or enlargements B′ in which are formed the sockets for the outer ends of the spokes. Each of these sockets has a cylindrical inner portion $c$ and a radial portion $c'$ the walls of which are straight and parallel except at their outer ends $c^2$ where they are beveled or flared for a purpose hereinafter described. The spoke sockets in both the hub and rim extend clear through the lugs and bosses, as clearly illustrated in the drawings.

Each spoke D is made of spring metal being relatively thin and wide, its width being approximately that of the lugs A′ and bosses B′, and each spoke is formed at each end with a semi-circular bent portion $d$ to receive a bolt or rivet E.

As before stated the spokes D are arranged in pairs, the inner ends of the two spokes of a pair being brought together in a single spoke socket in the hub where they are secured by means of a bolt or rivet E. As clearly shown in Fig. 6 the semi-circular ends $d$ are arranged within the cylindrical portion $a^2$ of the spoke socket in the hub and the bolt or rivet E securely holds them therein. The spokes are inserted sidewise into the socket and the bolts or rivets are applied in a similar way, and the headed ends of these bolts or rivets prevent sidewise movement of the spokes. The portions $d'$ of the spokes within the part $a^3$ of the socket are arranged close together and are parallel, but outside the sockets the spokes diverge from each other and continue to diverge toward the rim. It will be observed that the beveled or flared portions $a^4$ of the sockets are normally out of contact with the spokes. This is a feature of importance as the outer ends of the sockets do not thus present sharp corners to the sides of the spokes so that when under strain due to torsion the spokes at these points are not sharply bent, thus avoiding breakages which might otherwise occur. For a similar purpose the walls of the sockets where they are flared are also rounded, as shown. It will also be observed that the portion $a^3$ of each socket is of considerable length extending from the edges of the cylindrical portion $a^2$ radially outward to the beveled or flared portion $a^4$. The two adjacent spokes of the pair are thus held and supported close together for a considerable distance outward from the points of bending at the inner ends of the spokes. It is found in practice that when the metal is bent to form the semicircular ends $d$ at the inner and outer ends of the spoke that the metal is weakened not only at the exact point where the bend is made, but also in adjacent portions of the spoke and for this reason the spokes are placed close together in the straight portion $a^3$ of the socket and are held and supported for a considerable distance radially outward. If they were not thus confined and supported and the spokes were allowed to bend when in use near the parts $a^2$ of the sockets where the metal is weak they would be apt to break.

The outer ends of the two spokes of a pair are arranged in sockets $c$ in the rim which are located on radial lines on opposite sides of a radial line passing through the socket in the hub to which the spokes are secured, and these sockets $c$ in the rim are equi-distant from the radial line passing through the socket in the hub to which the spokes are attached. It will be observed that the spokes have portions which are arranged within parts of the sockets which have straight parallel walls similar to those $a^3$ before mentioned and that these portions of the spokes are held close together and are supported in the weakened portions near the bent ends $d$. The beveled or flared portions $c^2$ of the sockets are normally in contact with the sides of the spokes where they are bent to enter the sockets and the outer portions of the parts $c^2$ are rounded. In this way the spokes are prevented from being more sharply bent when under compression and breakages which might otherwise occur are avoided. The series of pairs of spokes are similarly arranged and it will be observed that the outer end of a spoke of each pair is arranged in the same spoke socket in the rim as the outer end of one of the spokes in an adjacent pair. In this way a minimum number of bolts or rivets can be used and a trusssd structure is obtained which, while affording the required resiliency, also resists all the strains and jars to which the wheel is subjected.

If the structure shown in Fig. 1 were straightened out and the periphery of the rim and the periphery of the hub were made of the same length and parallel a true trussed structure would be obtained, and therefore it will be seen that my wheel is formed by fore-shortening one member of the trussed structure and yet the same principles of construction are involved in the circular structure. Each pair of spokes provides diagonal diverging braces which not only resist weight and vertical strains but also torsional strains and in no case is an abrupt bend given to any part of a spoke which would result in breaking it. Another feature of importance is the way in which the spokes are disposed and shaped to cause the spokes of each pair to be separated from each other from the hub to the rim and to form the most pronounced bend nearer to the periphery of the wheel than to the hub. In this way not only is the bend made where there is the most room, but in action when the spokes bend under a load, or stretch, greater resiliency is afforded and more length of spring is obtained.

A wheel of the kind shown in Fig. 1 may be readily substituted for in ordinary automobile wheel using the same hub and ball bearings in the manner indicated in Fig. 4. In this case blocks of wood or other material F may be placed on opposite sides of the web $a$ and the same flanges G that belong to the automobile wheel and the same bolts H may be employed to secure my wheel in place. The wheel may be provided with a tread of any desired construction.

In Fig. 7 the rim B of my wheel is shown as being secured to a channel rim I, carrying a rubber tire or tread J of any suitable construction.

The manner of forming the spokes and of attaching them to the hub and rim enables me to economize not only in the use of bolts and rivets but also in the length of the spokes and to avoid the use of separate keys, wedges or similar devices heretofore employed. Furthermore, by bringing together the inner ends of each pair of spokes at the hub and by spreading the spokes and attaching them to the rim in the manner specified and by joining the two adjacent members or two pairs of spokes in the way described, I not only economize in the use of securing devices but I obtain a true trussed structure in a most simple way.

I claim as my invention:—

1. A wheel, comprising a hub formed with radial lugs provided with spoke sockets having inner cylindrical portions and radial portions with parallel walls connecting with walls which flare outwardly at the outer ends of the sockets, a rim formed with bosses provided with spoke sockets having outer cylindrical portions and radial portions with parallel walls connecting with inner flaring walls, curved spring spokes having bent portions at opposite ends fitting the cylindrical portions of the sockets in the hub and rim, and straight portions fitting closely the straight portions of the sockets.

2. A wheel, comprising a hub provided with spoke sockets having inner cylindrical portions and radial portions with parallel walls which connect with outwardly flaring walls, a rim provided with spoke sockets having outer cylindrical portions and radial portions with parallel walls which connect with inner portions having flaring walls, curved springs having bent portions at opposite ends fitting the cylindrical portions of the sockets in the hub and rim and straight radial portions fitting closely the straight portions of the sockets, each socket in the hub and rim receiving the ends of two spokes which ends are held in close contact with each other, substantially as described.

In testimony whereof, I have hereunto subscribed my name.

CHARLES F. WOMELDORF.

Witnesses:
LLOYD B. WIGHT,
E. H. McLACHLEN.